United States Patent [19]
Stuyts

[11] Patent Number: 5,259,246
[45] Date of Patent: Nov. 9, 1993

[54] APPARATUS FOR TESTING THE WHEEL SUSPENSION OF A VEHICLE

[75] Inventor: Victor C. L. H. Stuyts, Haarlem, Netherlands

[73] Assignee: Analogic Engineering, B.V., El Haarlem, Netherlands

[21] Appl. No.: 757,337

[22] Filed: Sep. 10, 1991

[30] Foreign Application Priority Data

Sep. 10, 1990 [NL] Netherlands ............... 9001989

[51] Int. Cl.$^5$ .............................................. G01M 17/04
[52] U.S. Cl. ........................................................ 73/669
[58] Field of Search ............................. 73/11, 669, 660

[56] References Cited

U.S. PATENT DOCUMENTS

| | | | |
|---|---|---|---|
| 3,815,404 | 6/1974 | Brisard | 73/669 |
| 3,855,841 | 12/1974 | Hunter | 73/11 |
| 3,981,174 | 9/1976 | Himmler | 73/11 |
| 4,103,532 | 8/1978 | Buzzi | 73/11 |
| 4,589,273 | 5/1986 | Tamasi et al. | 73/11 |

FOREIGN PATENT DOCUMENTS

| | | |
|---|---|---|
| 0359337 | 3/1990 | European Pat. Off. |
| 1253486 | 11/1967 | Fed. Rep. of Germany |
| 2556073 | 6/1977 | Fed. Rep. of Germany |

Primary Examiner—Hezron E. Williams
Assistant Examiner—Rose M. Finley
Attorney, Agent, or Firm—Lorusso & Loud

[57] ABSTRACT

Apparatus for testing a wheel suspension of a vehicle, comprising at least one measuring plate adapted to be moved by an excitation mechanism, a first measuring device for each measuring plate for measuring vertical forces exerted by an air tire of the vehicle on the measuring plate, a processing unit for processing measured values provided by the first measuring device and a display unit for displaying a measuring result. Further, a second measuring device is provided for measuring a selected one of a position, velocity and acceleration of the measuring plate. The processing unit being adapted to determine a transfer function of the wheel suspension from the measured values of the first measuring device and measured values of the second measuring device, the wheel suspension comprising a plurality of system elements, each of the system elements carrying a system value. The processing unit being adapted to compute values of the system elements from the transfer function the processing unit being adapted to utilize the system values to further compute at least one evaluation variable, and adapted to compare the evaluation variable with a stored evaluation variable, the processing unit being further adapted to estimate a final evaluation of the wheel suspension from the comparison, and the display unit being adapted to display the final evaluation.

10 Claims, 2 Drawing Sheets

APPARATUS FOR TESTING THE WHEEL SUSPENSION OF A VEHICLE

BACKGROUND OF THE INVENTION

The invention relates to an apparatus for testing the wheel suspension of a vehicle, comprising at least one measuring plate adapted to be moved by an excitation mechanism, a first measuring means for each measuring plate for measuring the vertical forces exerted by the air tire of the vehicle on the measuring plate, a processing unit for processing the measured values provided by the first measuring means and a display unit for displaying a measuring result.

While driving on a surface, vibrations are generated in the wheel suspension of a vehicle by the roughness of the surface. The most important vibration frequencies to which the wheel suspension of the vehicle is exposed during normal use on the road, lie in a range between 0 and 25 Hz. In this frequency range the wheel suspension generally shows two resonances, namely the resonance of the sprung mass (the body) lying between 0,7 and 2 Hz and the resonance of the unsprung mass (the wheel) lying between 10 and 15 Hz. The power density spectrum for usual speeds of the vehicle on the usual road surfaces shows a relatively high contents at low frequencies whereby the performance of the wheel suspension of the vehicle at low frequencies in particularly at the resonance frequency of the body, is of great importance.

In the known apparatus of the above-mentioned type conclusions are drawn from the course of the dynamic vertical force in the above-mentioned frequency range with respect to the operation of the shock absorbing element of the wheel suspension. The known apparatus however have the disadvantage that these conclusions are not always correct because the vertical force is also affected by other variables in the construction of the vehicle in addition to the shock absorbing element. For example the stiffness of the air tire has a great influence on the measuring results.

The invention aims to provide an improved apparatus of the above-mentioned type by means of which the wheel suspension of a vehicle can be evaluated with higher accuracy.

SUMMARY OF THE INVENTION

To this end the apparatus according to the invention is characterized in that a second measuring means is provided for measuring the position, velocity or acceleration of the measuring plate, wherein the processing unit determines from the measured values of both measuring means a transfer function of the wheel suspension seen as a system with a plurality of system elements, wherein the processing unit computes by means of an equivalent model of the system the values of the system elements from the transfer function, wherein the processing unit computes with the computed values of the system elements, the value of at least one evaluation variable and compares this value with a stored value of said evaluation variable and wherein the processing unit estimates an evaluation of the wheel suspension from this comparison and displays the same on the display unit.

In this manner unambiguous numerical values for the different system elements of the chosen equivalent model of the wheel suspension of the vehicle can be computed by means of which a relatively accurate evaluation can be given. As equivalent model a simplified linear double mass spring system can be chosen for example as will be explained hereafter.

As evaluation variables it is for example possible to choose the road surface load exerted by the corresponding wheel of the vehicle, the road-holding safety and the comfort of the passenger(s) of the vehicle.

According to a preferred embodiment of the invention the processing unit replaces one or more computed values of the system elements by a standard value of the corresponding system element, for example the value of an air tire with the correct stiffness, whereafter the processing unit computes with this standard value a corrected value for the (each) evaluation variable and compares the corrected value with the stored value for the (each) evaluation variable to obtain an evaluation of the wheel suspension.

In this manner it is possible to evaluate the wheel suspension of the vehicle substantially independent of for example the value of the tire stiffness during the measurement.

In practice the evaluation variables are closely related with the vehicle class of the vehicle tested. In this respect the vehicle class is defined as a certain combination of values for the system elements of the wheel suspension. In practice one can think for example of weight classes in combination with wheel suspension system designed for sporty driving or comfortable driving.

According to the invention it is advantageous to compare the computed value of the (each) evaluation variable with usual values for these evaluation variables for the corresponding vehicle class by means of a classification in such vehicle classes. To this end the apparatus according to the invention is characterized in that a plurality of combinations of value ranges of the system elements are stored and each combination corresponds with a predetermined class of vehicles, wherein the processing unit classifies the tested vehicle by means of the computed values of the system elements in a predetermined class of vehicles and compares the computed value of the (each) evaluation variable with the values of these evaluation variables applying for the corresponding class of vehicles.

In order to determine the transfer function with sufficient accuracy it is important to measure the vertical force exerted on the measuring plate by the wheel with high accuracy. According to invention it is to this end to be preferred that the processing unit corrects the measured values of the first measuring means for the force caused by the moving mass of the measuring plate.

According to a simple embodiment of the invention the processing unit determines the force caused by the mass of the measuring plate from the measured values of the second measuring means and the predetermined mass of the measuring plate, wherein that force is subtracted vectorially from the measured values of the first measuring means in the correct phase.

According to the invention the first measuring means can be calibrated in a simple manner in that the processing unit is adapted to make a calibration of the first measuring means by moving the measuring plate in an unloaded situation and by comparing the measuring value of the first measuring means caused by the moving mass of the measuring plate with a force value computed from the predetermined mass of the measuring plate, the amplitude of the movement and the frequency of the movement.

As already noted above, the resonance frequency of the body of the vehicle lies between 0,7 and 2 Hz and the power density in this low frequency range is relatively high during driving with usual speeds on the usual road surfaces, so that an accurate measurement at these low frequencies is of great importance. In order to exclude the influence of the excitation mechanism on the measurement at low frequencies as much as possible, a brake means is provided in a favorable embodiment of the invention, which brake means can be actuated by the processing unit, wherein the processing unit stops the excitation mechanism by actuating the brake means preferably substantionally at the resonance frequency of the body of the vehicle. Thereby it is obtained that in case of using a directly coupled flywheel excitation, the mutual influence of excitation mechanism and resonance of the body is minimized so that the forces exerted by the wheel suspension at resonance of the body of the vehicle on the measuring plate, can be measured accurately. Moreover this has the advantage that the overall measuring time is shortened as the measurement needs not to be continued until the excitation mechanism has passed the resonance frequency of the body autonomously.

In an apparatus of this type the display is generally mounted in a casing with a base, which casing is normally located at a distance from the measuring plate/- measuring plates in the driving direction beyond these measuring plates. Thereby cables have to be provided between the casing of the display and the measuring plate/measuring plates, whereby the mounting of the apparatus should be done by skilled persons and becomes time consuming and expensive. Moreover the apparatus occupies a relatively large floor surface.

According to the invention it is therefore t be preferred that the casing is provided with two display means with equal function, one of the display means enclosing an acute angle, the other display means enclosing an obtuse angle with the driving direction of the vehicle, wherein the casing is positioned beside the measuring plate of the apparatus.

In this manner a compact construction unit is obtained which occupies a little space and can be installed in a simple manner. One display is visible for the driver at testing the wheel suspension of the front wheels whereas the other display is visible at testing the rear wheels.

BRIEF DESCRIPTION OF THE DRAWINGS

The invention is explained hereafter by reference to the drawings in which an embodiment of the apparatus according to the invention is schematically shown.

DETAILED DESCRIPTION OF A PREFERRED EMBODIMENT

In the description the invention will be explained by means of an embodiment with an excitation mechanism with flywheel directly coupled with the (each) measuring plate, by which the (each) measuring plate can be driven harmonically. However it is also possible to use a different type of excitation, such as for example a so called drop down tester with step-wise excitation of the (each) measuring plate.

Figure 1:
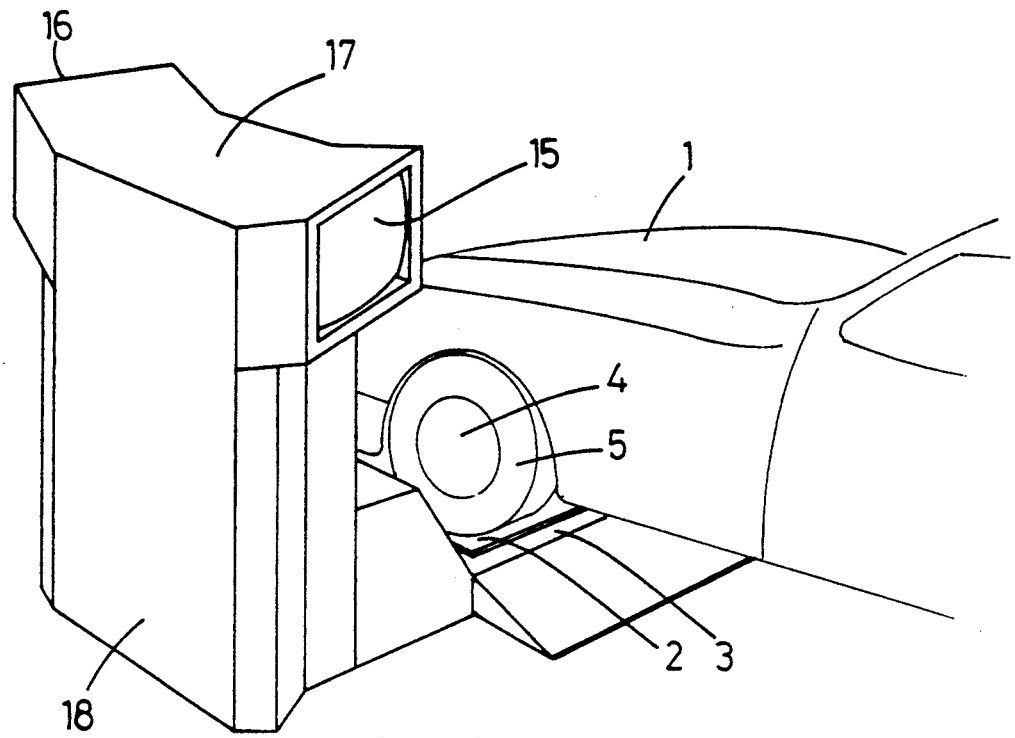
FIG. 1 shows in a perspective view schematically an embodiment of the apparatus according to the invention during testing the wheel suspension of the front wheels of a vehicle.
Figure 2:
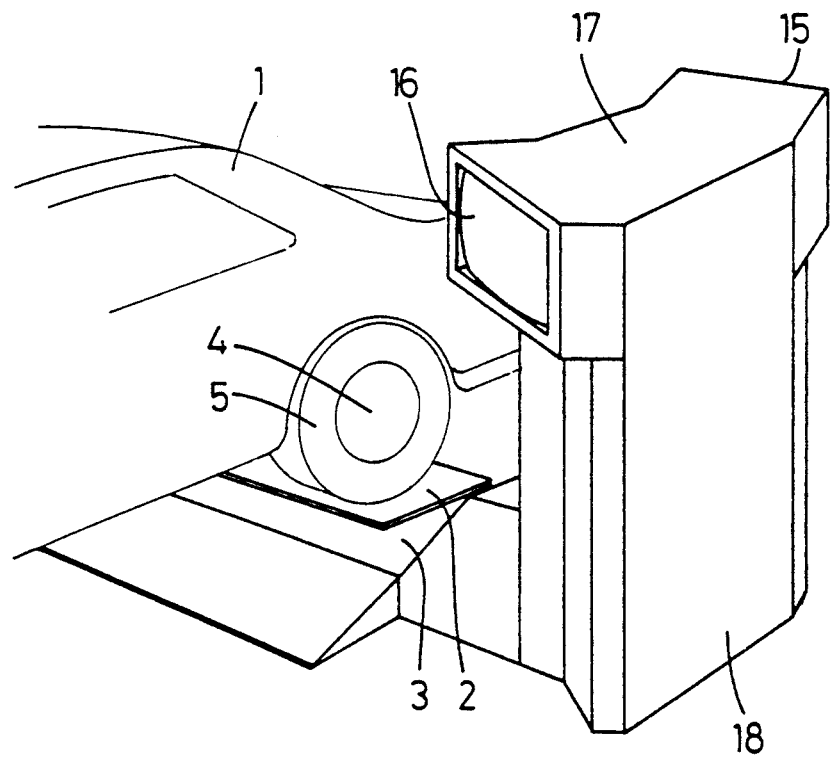
FIG. 2 shows in a perspective view the apparatus of FIG. 1 during testing the wheel suspension of the rear wheels of the vehicle.

In FIG. 1 and 2 there is shown in a perspective view an apparatus for testing the wheel suspension of a vehicle 1, which apparatus is provided with two measuring plates 2, one of which is shown in the drawing. If desired it is also possible to provide the apparatus with one measuring plate only. The measuring plates 2 are movable mounted in a frame 3, which can be placed on the floor of a workshop.

Figures 3, 5:
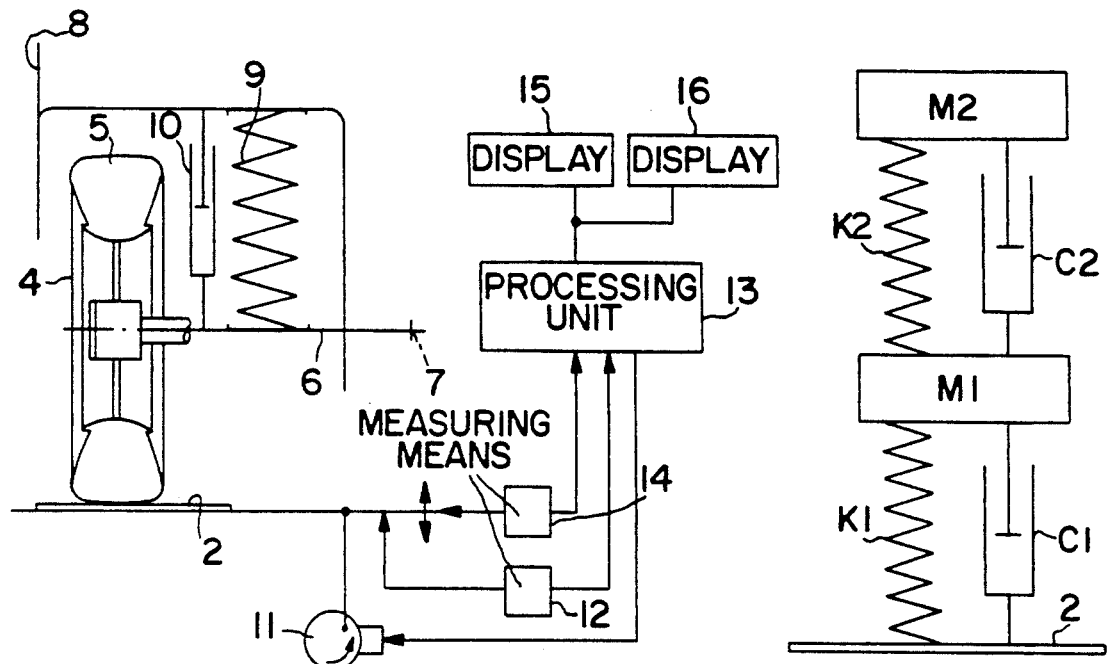
FIG. 3 shows the wheel suspension of the vehicle in a very schematically manner, wherein the apparatus according to the invention is schematically indicated.
FIG. 5 is a simplified linear double mass spring system as equivalent model for the wheel suspension of the vehicle.

The wheel suspension of the vehicle 1 is very schematically shown in FIG. 3, wherein a wheel 4 can be seen with an air tire 5, the wheel 4 being fixed to a support arm 6 connected to a hinge 7 with the vehicle body 8. A body support spring 9 and a shock absorber 10 are mounted between the body 8 and the support arm 6. The spring 9 has the purpose to keep the tire 5 continuously in contact with the road surface and to provide comfort for the passenger(s) in spite of roughness in the road surface. The shock absorber 10 absorbs the superfluous kinetic energy of the wheel 4 and the support arm 6. Further FIG. 3 schematically shows one of both measuring plates 2 of the apparatus for testing this wheel suspension.

By means of an excitation mechanism 11 the measuring plates 2 can be brought in a usual manner into an up- and downward harmonic movement with a variable frequency of movement for passing through the frequency range in which the frequencies are lying which occur during driving on the road surface with a usual speed. The excitation mechanism 11 comprises for example a motor with a flywheel wherein the motor rotates the flywheel until a frequency of movement of the measuring plate of approximately 25 Hz is obtained, whereafter the motor is stopped and the frequency decreases from 25 Hz until 0 Hz by slowing down of the flywheel. In this frequency range the wheel suspension generally shows two resonances, namely the resonance of the sprung mass, i.e. the body 8 with the chassis not further shown, between 0,7 and 2 Hz and the resonance of the unsprung mass, i.e. the wheel 4 with a part of the support arm 6, between 10 and 15 Hz.

For measuring the dynamic vertical force exerted by the wheel 4 on the road surface during driving, the apparatus described is provided with a first measuring means 12 for each measuring plate 2, connected to a processing unit 13 for processing the measured values provided by this measuring means 12. Further a second measuring means 14 is provided for measuring the position of the measuring plate 2, which measuring means is also connected to the processing unit 13. The measuring means 14 may also be adapted to measure the speed or the acceleration of the measuring plate 2, from which information the position can easily be derived.

From these different measured values the processing unit 13 estimates a measuring result which at the described apparatus is shown on two display units 15 and 16, respectively. These display units 15, 16 are mounted in a casing 17 with a base 18 which is combined with the frame 3 of the measuring plates 2 into a construction unit. Thereby a rather compact construction unit is obtained which occupies only a little space and can be installed in a simple manner. The display unit 15 encloses an acute angle with the driving direction so that this display unit 15 can be read by the driver during testing the wheel suspension of the front wheels. The display unit 16 encloses an obtuse angle with the driving direction so that this display unit 16 can be read by the driver during testing the wheel suspension of the rear wheels.

Figure 4:
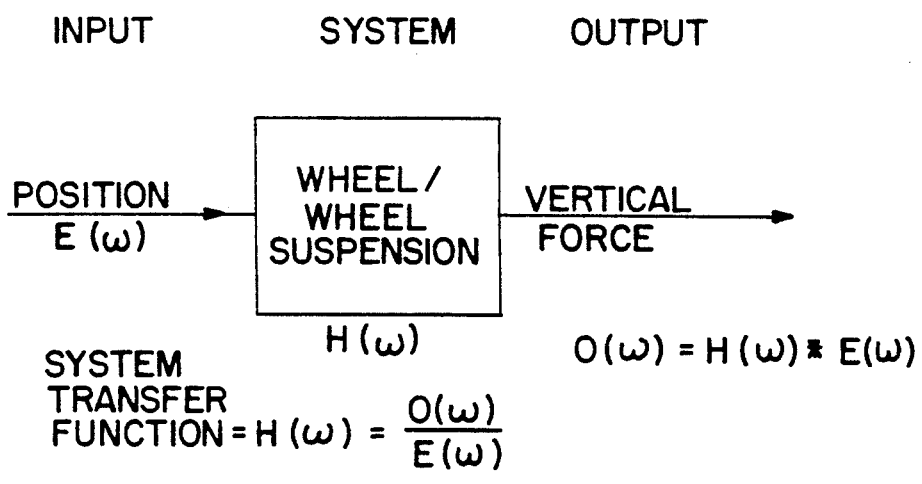
FIG. 4 shows a diagram of the wheel suspension seen as a system for determining the transfer function.

In the apparatus described the wheel suspension is seen as a system, to which the position of the measuring plate 2 is supplied as input signal and the dynamic vertical force on the measuring plate 2 is obtained as output signal, as schematically indicated in FIG. 4. The position signal is measured by the measuring means 14 whereas the force signal is measured by the measuring means 12, wherein the processing unit 13 determines the transfer function from the measured values of both measuring means 12, 14, which transfer function in the described embodiment is defined in the frequency domain as the quotient of the response of the system, i.e. the dynamic vertical force, and the excitation, i.e. the position of the measuring plate 2. In formula form it applies for the transfer function $H(\omega) = 0(\omega) / E(\omega)$ By means of an equivalent model of the system the processing unit computes the values of the system elements from this transfer function $H(\omega)$. As equivalent model it is for example possible to choose a simplified linear double mass spring system which is shown in FIG. 6. In FIG. 6 M1 is the unsprung mass of the wheel 4, the air tire 5, the braking system not shown and a part of the mass of the spring 9, the shock absorber 10 and the support arm 6. K1 and C1 are properties of the air tire 5, i.e. the spring stiffness and the internal damping. Normally the internal damping C1 of the air tire 5 is neglected. M2 is the part of the mass of the body 8 with chassis supported by the corresponding wheel 4 which mass is generally indicated as the sprung mass. K2 is the spring stiffness of the spring 9 whereas C2 is the damping of the shock absorber 10.

The processing unit 13 can compute the numerical values for the system elements M1, M2, K1, K2 and C2 for example as follows. For the equivalent model of FIG. 4 the following variables are defined:

$\omega(h)$ is the undamped resonance frequency of the sub-system formed by K1, K2 and M1;

$\omega(l)$ is the undamped frequency of the sub-system formed by K2 and M2;

Z is the relative damping factor of the sub-system formed by K2, M2 and C2;

M = M1 + M2 is the overall mass;

H(100) is the value of the transfer function at 100 Hz. If desired it is also possible to use another measuring frequency;

A0 is the amplitude of the movement of the measuring plate 2.

For the independent variable Z a range of values between 0 and 2 are chosen, wherein the magnitude of the intermediate steps can be chosen in dependence on the desired accuracy, for example 0, 0.1, 0.2, etc. For each value of Z the processing unit 13 executes the following seven steps:

Assume that it applies: $Z = C2 / 2 * SQRT(K2 * M2))$

Assume that it applies: $(\omega h) \wedge 2 = (K1 + K2) / M1$

Assume that it applies: $(\omega l) \wedge 2 = (K2 / M2)$

Assume that it applies: M = M1 + M2

Assume that it applies: H(100) = A0*K1

Compute the system elements M1, M2, K1, K2 and C2 from the above equations.

Compute the magnitude of the transfer function of the wheel suspension seen as system according to FIG. 4 in the frequency range in which the measurement of position and dynamic vertical force has been made with the same frequency resolution as used for the measurement.

Subsequently for each value of Z, the computed values for each frequency point are compared with the measured values according to a chosen criterium, for example the least squares method, wherein the processing unit 13 determines the best fitting curve taking into account any other preconditions to be made. The values for the system elements used to compute the best fitting curve, form the best estimate of the measured wheel suspension.

By means of the thus obtained numerical values for the system elements the processing unit computes values for several evaluation variables by means of which an evaluation of the wheel suspension may be made. These evaluation variables are for example the road surface load by the wheel 4 which may not fall below a predetermined minimum value, the road-holding safety and the comfort of the passenger(s) of the vehicle. The computed value of the evaluation variable is compared by the processing unit 13 with values stored in a memory not shown, wherein this comparison results in an evaluation of the wheel suspension which is shown on the display units 15, 16.

Because in the described apparatus numerical values are computed for all system elements of the chosen equivalent model, one or more system elements can be replaced by a standard value, in order to compute evaluation values on the basis of these standard values so that unambiguous measuring results are obtained for all vehicles. For example, it appears in practice that the stiffness of the air tire 5 strongly affects the measurement. This influence on the computation of the value for the evaluation variables can be eliminated by substituting a standard value for the stiffness K1 of the air tire 5 for example the average stiffness of the air tire 5. After this substitution the processing unit 13 can compute corrected values for the evaluation variables and compare these corrected values with the stored values. The evaluation of the wheel suspension of the vehicle is thereby substantially independent of the real value of the stiffness of the air tire 5.

The values of the evaluation variables are closely related with the vehicle class of the vehicle tested. The vehicle class is defined here as a combination of value ranges for the system elements of the equivalent model. An example for different vehicle classes is given in the following table I.

TABLE I

| in: | M1 kg | M2 kg | K1 kN | K2 kN | Z | M1 kg | M2 kg | K1 kN | K2 kN | Z |
|---|---|---|---|---|---|---|---|---|---|---|
| Class 1 | | | | | | | | | | |
| from | 25 | 150 | 90 | 15 | .3 | 20 | 75 | 90 | 15 | .3 |
| until | 35 | 200 | 115 | 18 | .4 | 30 | 125 | 115 | 18 | .4 |
| Class 2 | | | | | | | | | | |
| from | 30 | 150 | 100 | 15 | .25 | 20 | 100 | 150 | 18 | .25 |
| until | 35 | 200 | 150 | 18 | .35 | 30 | 150 | 180 | 18 | .35 |

TABLE I-continued

| in: | M1 kg | M2 kg | K1 kN | K2 kN | Z | M1 kg | M2 kg | K1 kN | K2 kN | Z |
|---|---|---|---|---|---|---|---|---|---|---|
| Class 3 | | | | | | | | | | |
| from | 35 | 350 | 150 | 15 | .2 | 35 | 300 | 150 | 15 | .2 |
| until | 50 | 450 | 200 | 18 | .3 | 50 | 350 | 200 | 18 | .5 |

In this table the relative damping factor Z is taken as evaluation variable. With the values for the system elements computed for the vehicle tested the processing unit 13 can classify the vehicle in a certain vehicle class by means of this table and subsequently compare the value of the evaluation variable Z computed for the tested vehicle with the value range for Z applying for the corresponding vehicle class. If the computed value Z falls outside this range, the shock absorber 10 does not meet the specifications anymore.

In order to make the above-explained computations with sufficient accuracy, it is of course of great importance to make an accurate measurement of the dynamic vertical forces containing sufficient information at said resonance frequencies of the wheel suspension.

To obtain a very accurate measurement of the dynamic vertical force exerted by the wheel 4 on the measuring plate 2 during the vertical movements of the measuring plate 2, the influence of the mass of the measuring plate 2 itself should be eliminated. For the vertical force measured by the measuring means 12 is the vectorial sum of the momentary force exerted by the wheel on the measuring plate 2 and the momentary force caused by the acceleration of the mass of the measuring plate 2. In the described embodiment the processing unit 13 corrects the measured values of the measuring means 12 in the correct phase for the force caused by this known mass of the measuring plate 2 so that the thus corrected measured values correspond accurately with the dynamic vertical force exerted by the wheel 4.

This correction can for example be obtained by vectorially subtracting the mass inertia forces exerted on the measuring plate 2 by the acceleration of the mass from the overall measured force taking the momentary phase into account. When the measuring means 14 measures the position of the measuring plate 2, the momentary acceleration can simply be determined by time differentiating the position twice.

In the described apparatus calibration of the first measuring means 12 may occur in a simple manner. This calibration is obtained by moving the measuring plate 2 with known mass MM unloaded. In case of using an excitation mechanism 11 with harmonic excitation it applies that the vertical force exerted on the measuring means 12 is also harmonical with the same frequency. The maximum amplitude of this vertical force is than $-\omega^2 * A0 * MM$, in which $\omega$ is the circular frequency and A0 is the amplitude. In case of a stepwise excitation the force should of course be computed according to a different formula. From the measuring value provided by the measuring means 12 and the corresponding frequency the processing unit 13 can determine in a simple manner the calibration or multiplying factor for converting the measured values of the measuring means 12 into force values in the desired unit.

Due to the presence of the measuring means 14 for measuring the position of the measuring plate 2 the described apparatus has further the advantage that this measuring means 14 measures any possible non-harmonic behaviour of the excitation of the excitation mechanism 11 so that during the computation of the transfer function this is automatically taken into account. Such non-harmonic phenomena especially occur at low frequencies because the excitation is than affected by the reactions of the tested vehicle on the measuring plate 2. This is in particular the case with an excitation mechanism with flywheel, wherein the flywheel is first accelerated in the above mentioned manner and subsequently slows down.

In view of the earlier mentioned resonance frequency at 1 Hz of the body 5 of the vehicle 1 and the high power density in the frequency spectrum at low frequencies at the usual speeds of a vehicle on the usual road surfaces, an accurate measurement at these low frequencies is of great importance. In order to eliminate as much as possible the mutual influence of the exitation mechanism and the resonance of the body at these low frequencies, a braking means is provided which is actuated by the processing unit 13 for stopping the excitation mechanism as soon as the body starts resonating. The processing unit 13 can determine this phenomenon for example by the increase of the value $|F|$ at decreasing frequency. By stopping the excitation the measuring means 12 can measure with high accuracy the forces exerted by the wheel 4 on the measuring plate 2 at resonance of the body. Moreover it is obtained in this manner that the overall measuring time is shortened as one needs not to wait anymore until the excitation mechanism 11 has passed the resonance frequency of the body due to the running out of the flywheel. If desired the excitation mechanism can already be stopped by the braking means after passing the resonance of the wheel suspension whereby the measuring time is further shortened.

The braking means not further shown can for example comprise a mechanical brake or as an alternative braking can be realized by electrical braking the motor of the excitation mechanism.

It is noted that the above described features for improving the accuracy, the calibration of the measuring means 12 and/or stopping the excitation can also be applied at an apparatus of the described type for testing the wheel suspension of a vehicle in a usual manner, wherein a transfer function and system elements are not computed. Further it is also possible to use the casing with two display units in other testing apparatus, preferably also combined with the corresponding apparatus into a construction unit.

Therefore the invention is not restricted to the above-described embodiment which can be varied in a number of ways within the scope of the claims.

I claim:

1. Apparatus for testing a wheel suspension of a vehicle, comprising:
   at least one measuring plate adapted to be moved by an excitation mechanism,
   a first measuring means for each measuring plate for measuring vertical forces exerted by an air tire of said vehicle on said measuring plate,
   a processing unit for processing measured values provided by said first measuring means,
   a display unit for displaying a measuring result,
   and a second measuring means for measuring a selected one of a position, velocity and acceleration of said measuring plate,
   said processing unit being adapted to determine a transfer function of said wheel suspension from said measured values of said first measuring means and measured values of said second measuring means, said wheel suspension comprising a plurality of system elements, each of said system elements carrying a system value, said processing unit being adapted to compute by means of an additional equivalent model of said system values of said system elements from said transfer function, said processing unit being adapted to utilize said system values to further compute at least one evaluation variable, and adapted to compare said evaluation variable with a stored evaluation variable, said processing unit being further adapted to estimate a final evaluation of said wheel suspension from said comparison, and said display unit being adapted to display said final evaluation.

2. Apparatus for testing a wheel suspension of a vehicle, comprising:

at least one measuring plate adapted to be moved by an excitation mechanism, a first measuring means for each measuring plate for measuring vertical forces exerted by an air tire of said vehicle on said measuring plate, a processing unit for processing measured values provided by said first measuring means, a display unit for displaying a measuring result, and a second measuring means for measuring a selected one of a position, velocity and acceleration of said measuring plate, said processing unit being adapted to determine a transfer function of said wheel suspension from said measured values of said first measuring means and measured values of said second measuring means, said wheel suspension comprising a plurality of system elements, each of said system elements carrying a system value, said processing unit being adapted to compute by means of an additional equivalent model of said system values of said system elements from said transfer function, said processing unit being adapted to utilize said system values to further compute at least one evaluation variable, and adapted to compare said evaluation variable with a stored evaluation variable, said processing unit being further adapted to estimate a final evaluation of said wheel suspension from said comparison, wherein said processing unit being adapted to replace one or more of said computer system values of said system elements by a standard value of a corresponding system element, for example a value of said air tire with a correct stiffness, whereafter said processing unit being adapted to compute with a standard value a corrected value for each of said evaluation variables and being further adapted to compare said corrected system value with said stored value for each of said evaluation variables to obtain an evaluation of said wheel suspension.

said display unit being adapted to display said final evaluation.

3. Apparatus for testing a wheel suspension of a vehicle, comprising:

at least one measuring plate adapted to be moved by an excitation mechanism, a first measuring means for each measuring plate for measuring vertical forces exerted by an air tire of said vehicle on said measuring plate, a processing unit for processing measured values provided by said first measuring means, a display unit for displaying a measuring result, and a second measuring means for measuring a selected one of a position, velocity and acceleration of said measuring plate, said processing unit being adapted to determine a transfer function of said wheel suspension from said measured values of said first measuring means and measured values of said second measuring means, said wheel suspension comprising a plurality of system elements, each of said system elements carrying a system value, said processing unit being adapted to compute by means of an additional equivalent model of said system values of said system elements from said transfer function, said processing unit being adapted to utilize said system values to further compute at least one evaluation variable, and adapted to compare said evaluation variable with a stored evaluation variable, said processing unit being further adapted to estimate a final evaluation of said wheel suspension from said comparison, wherein a plurality of combinations of system value ranges of said system elements are stored and each of said combinations correspond with a predetermined class of vehicles, wherein said processing unit being adapted to classify a tested vehicle by means of said computed system values of said system elements in said predetermined class of vehicles and being further adapted to compare said value of each of said evaluation variables with values of said evaluation variables applying for a corresponding class of vehicles.

said display unit being adapted to display said final evaluation.

4. Apparatus for testing a wheel suspension of a vehicle, comprising at least one measuring plate adapted to be moved by an excitation mechanism, a first measuring means for each measuring plate for measuring vertical forces exerted by an air tire of a vehicle on said measuring plate, and a processing unit for processing measured values provided by said first measuring means, wherein said processing unit being adapted to correct said measured values of said first measuring means for a force caused by a moving mass of said measuring plate.

5. Apparatus according to claim 4, wherein a second measuring means is provided for measuring a selected one of a position, velocity and acceleration of said measuring plate, wherein said processing unit being adapted to determine said force caused by said mass of said measuring plate from measured values of said second measuring means and a predetermined mass of said measuring plate, wherein said force is subtracted vectorially from said measured values of said first measuring means in a correct phase.

6. Apparatus for testing a wheel suspension of a vehicle, comprising:

at least one measuring plate adapted to be moved by an excitation mechanism, a first measuring means for each measuring plate for measuring vertical forces exerted by an air tire of said vehicle of said measuring plate, a processing unit for processing measured values provided by said first measuring means, and a display unit for displaying a measuring result, wherein said processing unit being adapted to make a calibration of said first measuring means by moving said measuring plate in an unloaded situation and by comparing said measured value of said first measuring means caused by a mass of said measuring plate with a force value computed from a predetermined mass of said measuring plate, an amplitude of a movement and a frequency of said movement.

7. Apparatus for testing a wheel suspension of a vehicle, comprising at least one measuring plate adapted to be moved by an excitation mechanism, a first measuring means for each measuring plate for measuring vertical forces exerted by an air tire of said vehicle of said measuring plate, a processing unit for processing measured values provided by said first measuring means, a display unit for displaying a measuring result, wherein a brake means is provided, said brake means being actuated by said processing unit, wherein said processing unit being adapted to stop said excitation mechanism by activating said brake means after passing a resonance frequency of said wheel suspension, whereafter said processing unit being further adapted to process said measured values provided by said first measuring means for measuring forces exerted by said wheel on said measuring plate after said excitation mechanism has been stopped.

8. Apparatus according to claim 7, wherein said processing unit being adapted to stop said excitation mechanism substantially at said resonance frequency of a body of said vehicle.

9. Apparatus for testing a wheel suspension of a vehicle, comprising at least one measuring plate adapted to be moved by an excitation mechanism, a first measuring means for each measuring plate for measuring vertical forces exerted by an air tire of said vehicle on said measuring plate, a processing unit for processing measured values provided by said first measuring means, and a display unit for displaying a measuring result, wherein said display unit is mounted in a casing with a base, said casing being provided with two display means with equal function, one of said display means being adapted to enclose an acute angle, the other display means being adapted to enclose an obtuse angle with a driving direction of said vehicle, wherein said casing being disposed beside said measuring plate of said apparatus.

10. Apparatus according to claim 3, wherein said casing is combined with each of said measuring plates into one construction unit.

* * * * *